(12) United States Patent
Sakamoto (10) Patent No.: US 10,189,353 B2
(45) Date of Patent: Jan. 29, 2019

(54) ON-VEHICLE STRUCTURE

(71) Applicant: TOYOTA JIDOSHA KABUSHIKI KAISHA, Toyota-shi, Aichi-ken (JP)

(72) Inventor: Yusuke Sakamoto, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 71 days.

(21) Appl. No.: 15/218,371

(22) Filed: Jul. 25, 2016

(65) Prior Publication Data

US 2017/0028849 A1 Feb. 2, 2017

(30) Foreign Application Priority Data

Jul. 30, 2015 (JP) ................................ 2015-150306

(51) Int. Cl.
   *B60K 1/00* (2006.01)
   *B60K 28/14* (2006.01)
   *B60L 15/00* (2006.01)

(52) U.S. Cl.
   CPC ............. *B60K 28/14* (2013.01); *B60K 1/00* (2013.01); *B60L 15/007* (2013.01); *B60Y 2306/01* (2013.01); *Y02T 10/7258* (2013.01)

(58) Field of Classification Search
   CPC ......... B60K 28/14; B60K 1/00; B60L 15/007; Y02T 10/7258; B60Y 2306/01
   See application file for complete search history.

(56) References Cited

U.S. PATENT DOCUMENTS

| | | | | |
|---|---|---|---|---|
| 9,205,749 | B2* | 12/2015 | Sakamoto | ............... B60K 1/00 |
| 9,440,593 | B2* | 9/2016 | Sakamoto | ............. F16B 5/0241 |
| 9,630,501 | B2* | 4/2017 | Shiba | .................... B60L 3/0007 |
| 9,894,812 | B2* | 2/2018 | Sakamoto | .......... H05K 7/20872 |
| 10,052,942 | B2* | 8/2018 | Okuda | .................... B60K 1/00 |
| 2015/0107920 | A1 | 4/2015 | Sakamoto | |

FOREIGN PATENT DOCUMENTS

| | | |
|---|---|---|
| JP | 2013-193634 A | 9/2013 |
| JP | 2013-233836 A | 11/2013 |
| JP | 5754551 B2 | 7/2015 |
| JP | 2016-145017 A | 8/2016 |

* cited by examiner

*Primary Examiner* — Paul N Dickson
*Assistant Examiner* — Joselynn Y Sliteris
(74) *Attorney, Agent, or Firm* — Sughrue Mion, PLLC (57) ABSTRACT

An on-vehicle structure includes a housing of a motor and a power control unit. The power control unit is fixed by a front bracket and a rear bracket above the housing. A space is defined between a lower surface of the power control unit and the housing. The front bracket includes a base section and a support section. The support section is configured to contact with the housing before the lower surface of the power control unit contacts with an upper surface of the housing when the support section is collapsed rearward by a load applied to the power control unit from front.

2 Claims, 8 Drawing Sheets

ON-VEHICLE STRUCTURE

INCORPORATION BY REFERENCE

The disclosure of Japanese Patent Application No. 2015-150306 filed on Jul. 30, 2015 including the specification, drawings and abstract is incorporated herein by reference in its entirety.

BACKGROUND

1. Technical Field

The present disclosure relates to an on-vehicle structure for a power control unit that drives a motor for traveling (traveling motor).

2. Description of Related Art

A vehicle that travels by using an electric motor includes a power control unit for driving the electric motor. Noted that a technique disclosed in this specification is not limited to application to an electric vehicle but can also be applied to a hybrid vehicle and a fuel cell vehicle. In addition, for simplification of the description, the "electric motor" will simply be described as a "motor".

The power control unit is typically an inverter that converts DC power output by a DC power supply to AC power. The power control unit possibly includes a booster converter. Several types of vehicles, in which the traveling motor is provided, include the motor and the power control unit in a front space (an engine compartment) of the vehicle. In this specification, according to a custom in a technical field of an automobile, a space for housing a traveling motor is described as "engine compartment" regardless of whether an engine is actually mounted or not.

The power control unit is possibly fixed above a housing of the motor. By arranging the power control unit near the motor, a power cable that connects the power control unit and the motor is shortened, and thus loss in power transmission can be suppressed. One example of such an on-vehicle structure for the power control unit is disclosed in Japanese Patent Application Publication No. 2013-233836 (JP 2013-233836 A). In a technique disclosed in JP 2013-233836 A, in order to protect the power control unit from vibrations of the motor, a front portion and a rear portion of the power control unit are respectively supported by a front bracket and a rear bracket, and the power control unit is fixed with a space being formed above the housing.

Components that handle power of tens of kilowatts exist in the power control unit. The power control unit is desired to be high in collision safety so that a high-voltage circuit therein is not exposed during a collision of the vehicle. A device that is arranged in the front space of the vehicle possibly receives a significant shock when the vehicle is involved in a frontal collision. Meanwhile, the housing of the motor is relatively large and rigid. Thus, arrangement of the power control unit above the housing of the motor is also suited for protection of the power control unit from an obstacle that approaches from the front during the collision. Despite such arrangement, depending on a case, a collision shock possibly hits the power control unit, which is fixed above the housing, during the collision. For example, there is a case where the vehicle is involved in the frontal collision with the obstacle at a high speed. Alternatively, in a collision aspect in which only a front right portion (or a front left portion) of the vehicle collides with the obstacle instead of the frontal collision of the vehicle with the obstacle, the obstacle possibly enters deep inside the front space of the vehicle, and the device arranged in the front space possibly receives a significant collision load. Noted that the collision aspect in which only the front right portion (or the front left portion) of the vehicle collides with the obstacle is called an overlap collision (or an oblique collision) and the like. The overlap collision will be described again in the section of the detailed description of embodiments.

SUMMARY

It has become apparent that the following phenomenon possibly occurs to the on-vehicle structure, in which the power control unit is supported with the space being provided above the housing, during the collision. In the case where the obstacle collides with the power control unit from front (or oblique front), the front bracket is deformed and collapsed to the rear. As a result, there is a possibility that a lower surface of the power control unit severely contacts the housing. This specification relates to an on-vehicle structure for a power control unit in a front space of a vehicle and provides a technique of alleviating a shock that occurs at a time when the power control unit collides with a housing in a case of a collision of the vehicle and the like.

An on-vehicle structure includes a motor unit and a power control unit. The motor unit includes a housing and a motor for traveling housed in the housing. The power control unit is configured to drive the motor and mounted in a front space of a vehicle. The power control unit is fixed by a front bracket and a rear bracket above the housing. A space is defined between a lower surface of the power control unit and the housing. The rear bracket is configured to support a rear side of the power control unit on the housing. The front bracket is configured to support a front side of the power control unit on the housing. The front bracket includes a base section and a support section. The base section is fixed to the housing. The support section extends from the base section to the power control unit. The support section is configured to contact with the housing before the lower surface of the power control unit contacts with an upper surface of the housing when the support section is collapsed rearward by a load applied to the power control unit from front.

By the above on-vehicle structure, momentum of the power control unit for approaching the housing is weakened by contact between the support section and the housing. Thus, contact between the power control unit and the housing can be avoided. Alternatively, there can be such a case where the support section is further deformed after the contact with the housing and the power control unit comes in contact with the housing. Even in such a case, the momentum of the power control unit for approaching the housing is weakened by the contact between the support section and the housing. Thus, a shock received by the power control unit through the contact with the housing is alleviated.

In the above on-vehicle structure, T is a length from a coupling point between the support section and the base section to a front end of the lower surface. T satisfies a relationship $G > T \cdot \{\sin(B) - \sin(A)\}$ in a side view of the power control unit and the housing, where A is an angle defined by a first linear line with respect to a reference line. The first linear line passes through the coupling point and the front end when the support section is collapsed and contacts with the housing The reference line is parallel to the lower surface of the power control unit before collapse of the support section and passes through the coupling point. B is an angle defined by a second linear line with respect to the reference line. The second linear line passes through the coupling point and the front end before the support section is collapsed. G is a gap of the space between the lower surface and the housing before the collapse of the support section.

The support section may include a projection. The projection contacts with the housing when the support section is collapsed rearward.

The housing may include a projection. The projection contacts with the support section and the housing when the support section is collapsed rearward.

The relationship of formula 1 described above can be realized relatively easily. For example, a projection needs to be provided on only one of the support section and the housing. By providing the projection, value of A in formula 1 is increased, and a right side of formula 1 is reduced. This on-vehicle structure easily enables to alleviate a shock that occurs at a time when the power control unit collides with a housing.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description will be made on an on-vehicle structure in a first embodiment with reference to the drawings. An on-vehicle structure 2 in the first embodiment is applied to a hybrid vehicle 100 that includes both of a traveling motor 3 and an engine 98. The on-vehicle structure 2 is a structure in which a power control unit 20 for driving the motor 3 is fixed above a housing 30. The housing 30 houses the motor 3, a power split mechanism 6, and a differential gear 4. For simplification of the description, the "power control unit 20" will hereinafter be abbreviated as a "PCU 20". The PCU stands for the power control unit.

Figure 1:
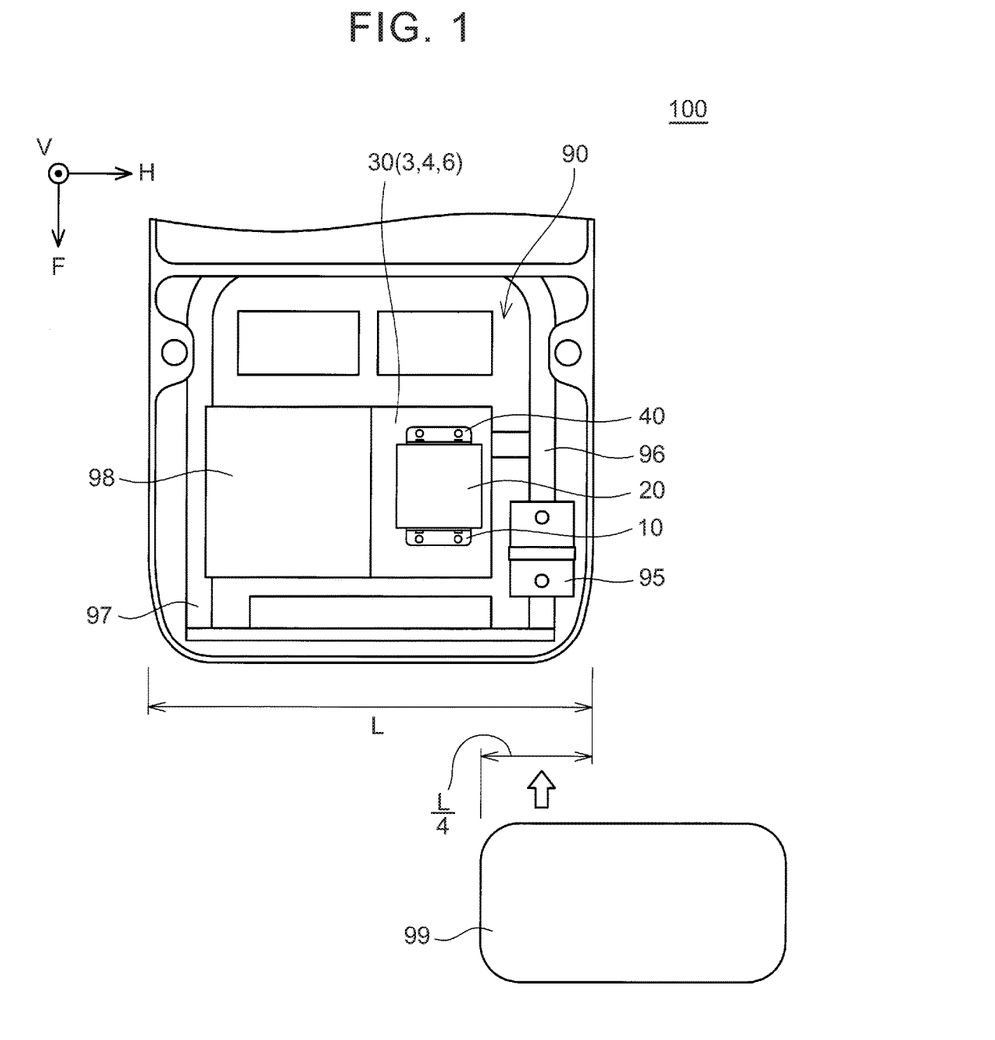
FIG. 1 is a top view that shows one example of a component layout of an engine compartment.
Figure 2:
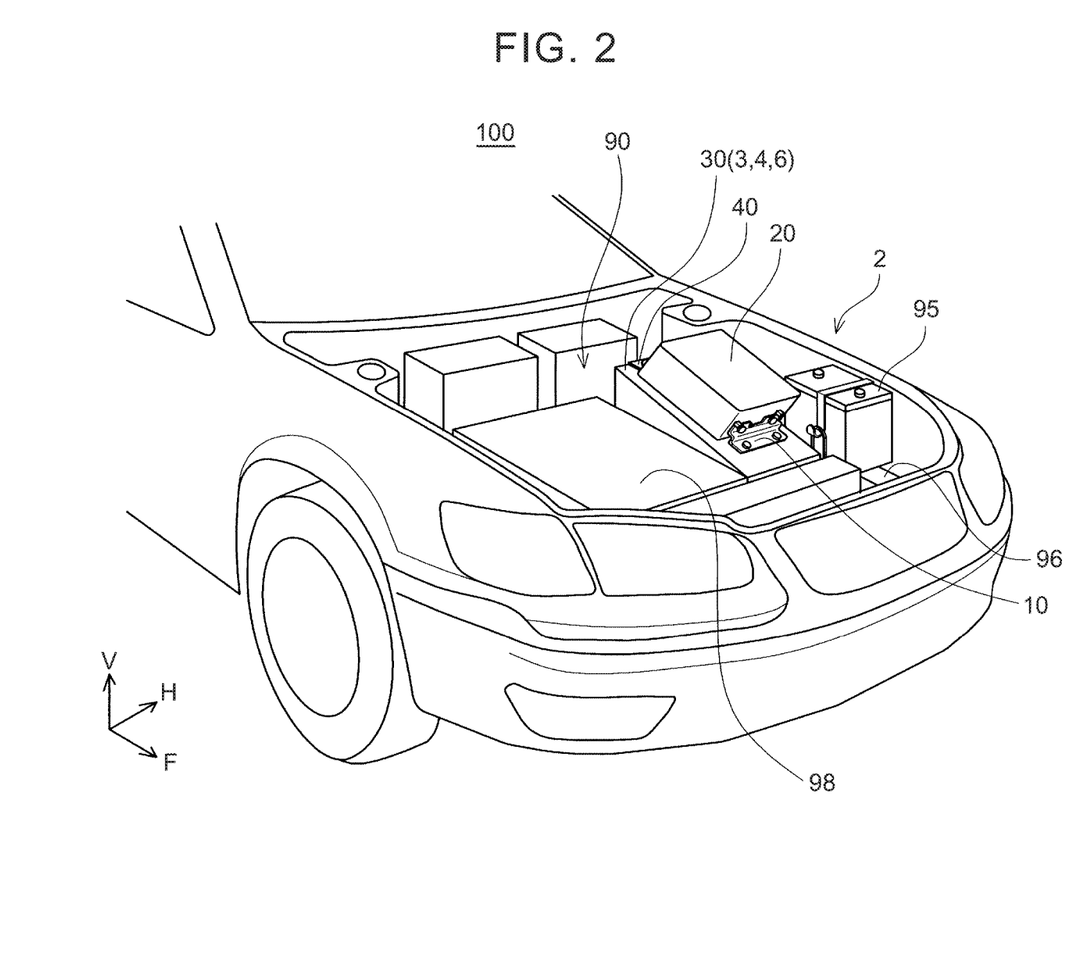
FIG. 2 is a perspective view that shows the one example of the component layout of the engine compartment.

FIG. 1 and FIG. 2 show arrangement of devices in an engine compartment 90 of the hybrid vehicle 100. FIG. 1 is a view (a top view) in which the engine compartment 90 is seen from above, and FIG. 2 is a perspective view in which the engine compartment 90 is seen obliquely from above. The engine compartment 90 of the hybrid vehicle 100 is located in a front section of the vehicle. Noted that, in a coordinate system in the drawing, an F-axis indicates the front of the vehicle, a V-axis indicates an upper side of the vehicle, and an H-axis indicates a vehicle width direction (sides of the vehicle). The reference numerals of the coordinate system have the same meanings in the following drawings.

An engine 98, the PCU 20, the housing 30, and the like are arranged in the engine compartment 90. Although various other devices are also arranged in the engine compartment 90, these are not shown. The housing 30, the engine 98, and the like are schematically illustrated in FIG. 1.

As described above, in addition to the motor 3, the power split mechanism 6 and the differential gear 4 are housed in the housing 30. The power split mechanism 6 is a gear set that combines/separates output torque of the engine 98 and output torque of the motor 3. Depending on a situation, the power split mechanism 6 splits the output torque of the engine 98 and transmits the split torque to the differential gear 4 and the motor 3. Because the differential gear 4 is embedded, the housing 30 can also be said as a case for the motor and a transaxle. The housing 30 is formed by die casting or grinding aluminum, for example.

The engine 98 and the housing 30 are coupled in such a manner so as to be arranged next to each other in the vehicle width direction. The engine 98 and the housing 30 are suspended from two side members 96, 97 that secure structural strength of the vehicle.

The PCU 20 is a device that drives the motor 3. More specifically, the PCU 20 boosts power of a high-voltage battery, which is not shown, then converts the power to AC power, and the supplies the AC power to the motor 3. In addition, there is a case where the PCU 20 converts the AC power that is generated by the motor 3 to DC power and lowers a voltage thereof. The power, the voltage of which has been lowered, is stored in the high-voltage battery.

Although the details will be described below, the PCU 20 is supported with a space being formed between the PCU 20 and an upper surface of the housing 30. A front side of the PCU 20 is supported by a front bracket 10, and a rear side thereof is supported by a rear bracket 40.

The housing 30 has high strength and is large in size. Accordingly, a shock that is generated at a time when the hybrid vehicle 100 collides with an obstacle is less likely to be transmitted to the PCU 20 that is arranged above the housing 30. However, in the case where the hybrid vehicle 100 is involved in the collision at a high speed or where the hybrid vehicle 100 is involved in the collision in an aspect called an overlap collision, the PCU 20 possibly receives the shock of the collision (a collision load). Here, the overlap collision will be described briefly. A collision of the two vehicles that travel in opposite directions from each other is assumed. In comparison with a case where the two vehicles completely overlap and collide with each other when seen from a traveling direction, the shock (the collision load) is increased in a case where only portions of the two vehicles overlap and collide when seen from the traveling direction. The Insurance Institute for Highway Safety (IIHS) defines various collision modes on the collision, and, among the modes, a collision mode called "small overlap" is available. In this "small overlap", a collision in a state where only 25% (25% in the vehicle width direction) of a front surface of the vehicle overlaps with the obstacle (the other party's vehicle) is assumed. As shown in FIG. 1, in the hybrid vehicle 100 in vehicle width L, a case where a range of L/4 of the front surface in the vehicle width direction collides with an obstacle 99 is a small overlap collision. In this case, the shock of the collision (the collision load) is concentrated in the range of L/4, and the obstacle 99 enters deeply into the engine compartment 90. When the obstacle 99 (or another component that is moved to the rear by the obstacle 99) collides with the PCU 20, a significant collision load is applied from the front to the PCU 20. Although the details will be described below, front and rear portions of the PCU 20 are supported by the front bracket 10 and the rear bracket 40 with a space being formed above the housing 30. When the significant collision load is applied from the front to the PCU 20, the front bracket 10 and the rear bracket 40 are possibly deformed to the rear, and the PCU 20 possibly hits the housing 30. The technique that will be described in this embodiment alleviates the load received by the PCU 20 at the time.

Figure 3:
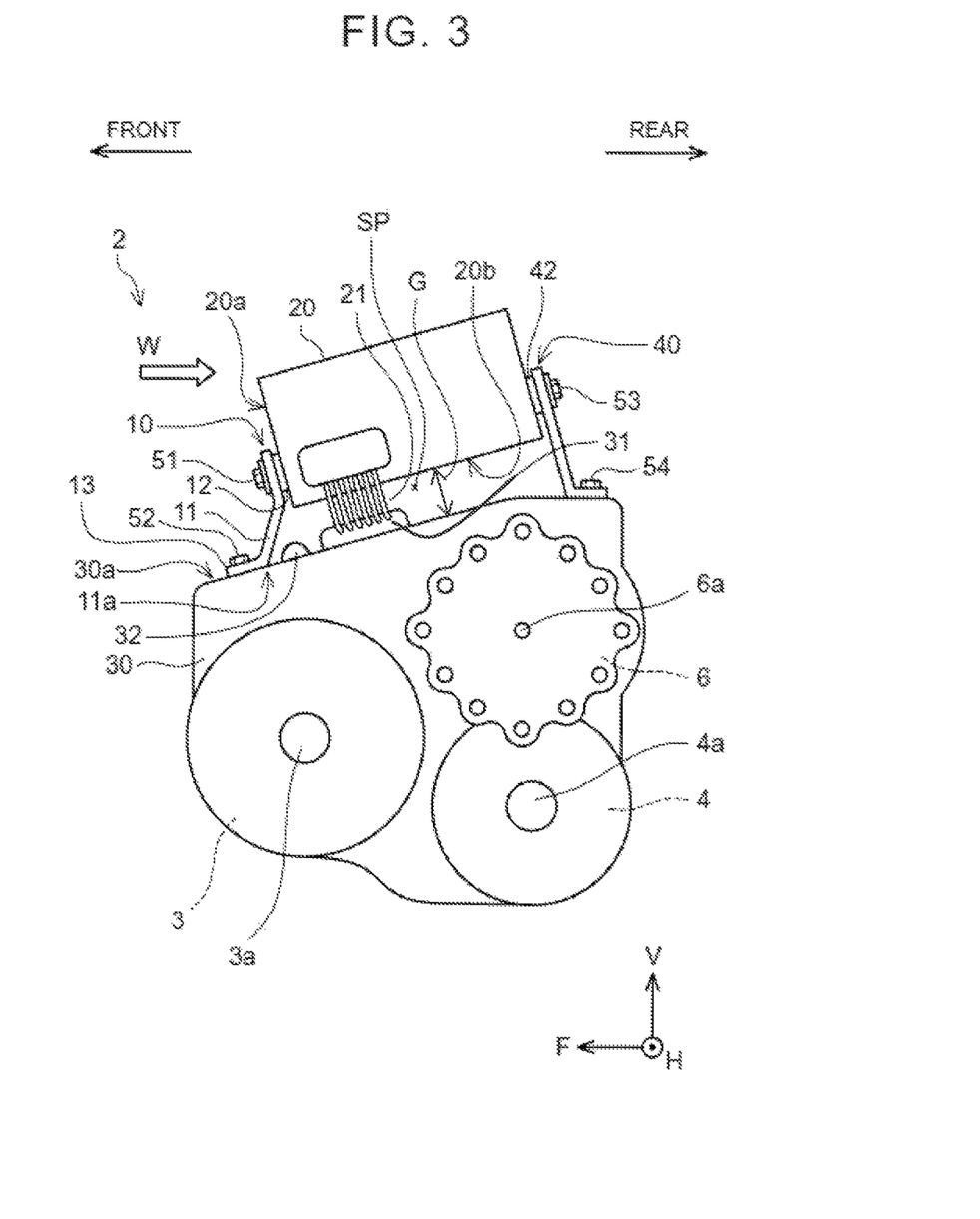
FIG. 3 is a side view of a housing and a power control unit.

A detailed description will be made on a relationship between the housing 30 and the PCU 20 with reference to FIGS. 1, 2 as well as FIG. 3. FIG. 3 is a side view that explains the on-vehicle structure 2. The "side view" is a view that is seen from the vehicle width direction (an H-axis direction in the drawing).

The PCU 20 and the housing 30 are connected by six power cables 21. The power cable 21 is a wire harness for transmitting the power from the PCU 20 to the motor 3. Although it is not described so far, the housing 30 houses two three-phase AC motors, and the six power cables 21 transmit two sets of three-phase AC power. The reference numeral 31 denotes a power cable terminal that is provided on an upper surface 30*a* of the housing 30. While the two motors are housed in the housing 30, the description will be continued below by focusing on one of the motors (the motor 3).

As described above, the motor 3, the power split mechanism 6, and the differential gear 4 are housed in the housing 30. In the housing 30, an output shaft 3*a* of the motor 3, a main shaft 6*a* of the power split mechanism 6, and a main shaft 4*a* of the differential gear 4 are arranged in parallel. Those three shafts extend in the vehicle width direction. As shown in FIG. 3, the three shafts are arranged to form a triangle when seen from the vehicle width direction. Due to arrangement of the three shafts, the upper surface 30*a* of the housing 30 descends forward. Thus, the PCU 20 that is supported above the upper surface 30*a* is also arranged to descend forward.

The PCU 20 is supported above the housing 30 by the front bracket 10 and the rear bracket 40. The front bracket 10 supports a front surface 20*a* of the PCU 20, and the rear bracket 40 supports a rear surface of the PCU 20. A space SP in a gap G is formed between a lower surface 20*b* of the PCU 20 and the housing 30. This space SP is formed by the front bracket 10 and the rear bracket 40. Although not shown, there is a case where the upper surface 30*a* of the housing 30 has several projections other than a projection 32, which will be described below. Even in the case where the several projections are provided on the upper surface 30*a*, the gap G means the shortest distance between the lower surface 20*b* of the PCU 20 and the upper surface 30*a* of the housing 30.

The front bracket 10 includes: a base section 13 that is fixed to the housing 30; and a support section 11 that extends from the base section 13 to the PCU 20. In other words, the support section 11 extends upward from the base section 13. The base section 13 is fixed to the upper surface 30*a* of the housing 30 by bolts 52, and an upper portion of the support section 11 is coupled to the front surface 20*a* of the PCU 20 by bolts 51. A vibration-proof bush 12 is interposed between the upper portion of the support section 11 and the PCU 20. As shown in FIG. 2, the front bracket 10 is fixed to the housing 30 by two bolts that are aligned in the vehicle width direction, and is coupled to the PCU 20 by the two other bolts that are aligned in the vehicle width direction. The front bracket 10 is formed by pressing a metal sheet (a steel sheet). Noted that a shape of the front bracket 10 is shown in a simplified manner in FIG. 1 to FIG. 3. One example of the detailed shape of the front bracket will be described below by using FIG. 7.

Although the detailed description will not be made, the rear bracket 40 has a similar structure to the front bracket 10. The rear bracket 40 also includes: a base section that is fixed to the housing 30; and a support section that extends from the base section to the PCU 20. The base section of the rear bracket 40 is fixed to the upper surface 30*a* of the housing 30 by bolts 54. An upper portion of the support section of the rear bracket 40 is fixed to the rear surface of the PCU 20 by bolts 53. A vibration-proof bush 42 is interposed between the upper portion of the support section of the rear bracket 40 and the rear surface of the PCU 20.

The motor 3, the power split mechanism 6, and the differential gear 4 vibrate violently during traveling. In addition, because the engine 98 is coupled to the housing 30, the housing 30 also vibrates violently by the engine 98. In order to protect the PCU 20 from vibrations of the housing 30, the PCU 20 is supported with the space SP in the gap G being provided above the housing 30, and is also supported by the front bracket 10 and the rear bracket 40 via the vibration-proof bushes 12, 42.

As described above, the support section 11 of the front bracket 10 extends from the base section 13, which is fixed to the housing 30, to the PCU 20. The projection 32 is provided at the rear of the support section 11 on the upper surface 30*a* of the housing 30. The support section 11 extends upward to the rear, and the projection 32 is provided at a position where it opposes the support section 11. The projection 32 is provided for the following purpose. Now, it is assumed that the obstacle collides with the PCU 20 from the front during a frontal collision. That is, the PCU 20 receives a collision load from the front. An arrow W in FIG. 3 indicates the collision load from the front. The PCU 20 is pressed to the rear by the collision load W. At this time, the support section 11 is collapsed to the rear with a coupling point 11*a* to the base section 13 being a fulcrum. In conjunction with collapse of the support section 11 to the rear, the PCU 20 is pulled downward. Accordingly, the lower surface 20*b* of the PCU 20 possibly comes in contact with the housing 30. Size and the position of the projection 32 are determined with respect to the support section 11 such that the support section 11 comes in contact with the housing 30 before the lower surface 20*b* of the PCU 20 comes in contact with the upper surface 30*a* of the housing 30 when the support section 11 is collapsed to the rear. The support section 11 comes in contact with the projection 32 (the housing 30) before the lower surface 20*b* of the PCU 20 comes in contact with the upper surface 30*a* of the housing 30. Accordingly, the shock received by the PCU 20 during contact with the housing 30 is alleviated. The projection 32 is provided to alleviate the shock at a time when the PCU 20 comes in contact with the housing 30 during the frontal collision (including the overlap collision) of the vehicle.

Figure 4:
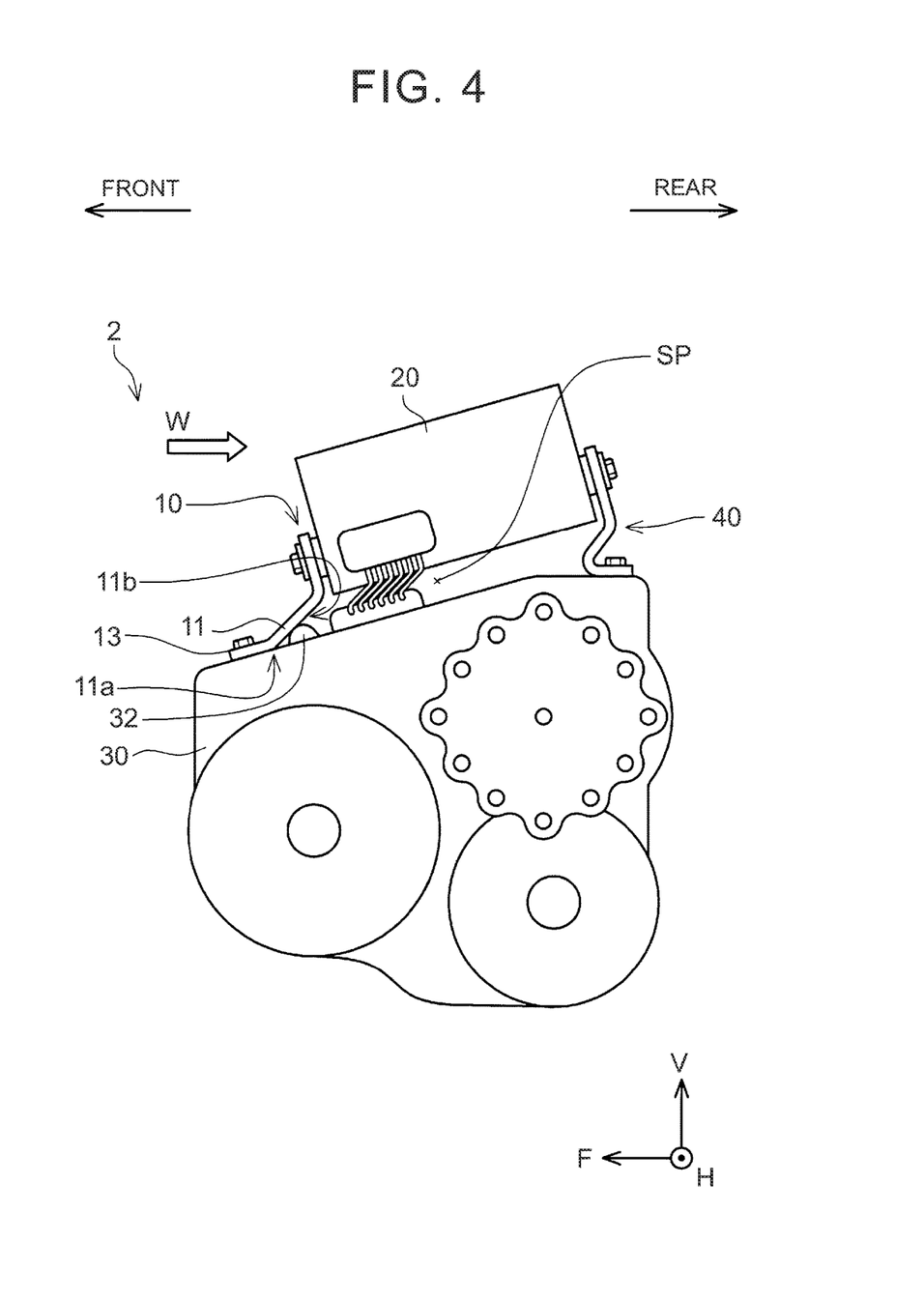
FIG. 4 is a side view of the housing and the power control unit after a support section is collapsed.

FIG. 4 shows a state where the PCU 20 receives the collision load W, the PCU 20 moves downward to the rear, and the support section 11 is collapsed to the rear and comes in contact with the projection 32. Due to the collision load W from the front, the support section 11 is collapsed to the rear with the coupling point 11*a* coupled to the base section 13 being the fulcrum. As clearly shown in FIG. 4, when the support section 11 is in contact with the projection 32, the PCU 20 does not come in contact with the housing 30, and a space is formed between the lower surface 20*b* of the PCU 20 and the upper surface 30*a* of the housing 30. The support section 11 comes in contact with the projection 32 before the PCU 20 comes in contact with the housing 30. Accordingly, momentum of the support section 11 during the collapse (that is, momentum of the PCU 20 that causes approach to the housing 30) is weakened. After the support section 11 comes in contact with the projection 32, an upper portion thereof from a contact point with the projection 32 is possibly deformed, and thus the PCU 20 possibly comes in contact with the housing 30. Even in such a case, as described above, the shock received by the PCU 20 during contact with the housing 30 is alleviated. Noted that, in the case where the shock during the vehicle collision is small, the contact of the PCU 20 with the housing 30 is possibly avoided by the contact of the support section 11 with the housing 30. The reference numeral 11*b* in FIG. 4 indicates the contact point of the support section 11 with the projection 32.

Figure 5:
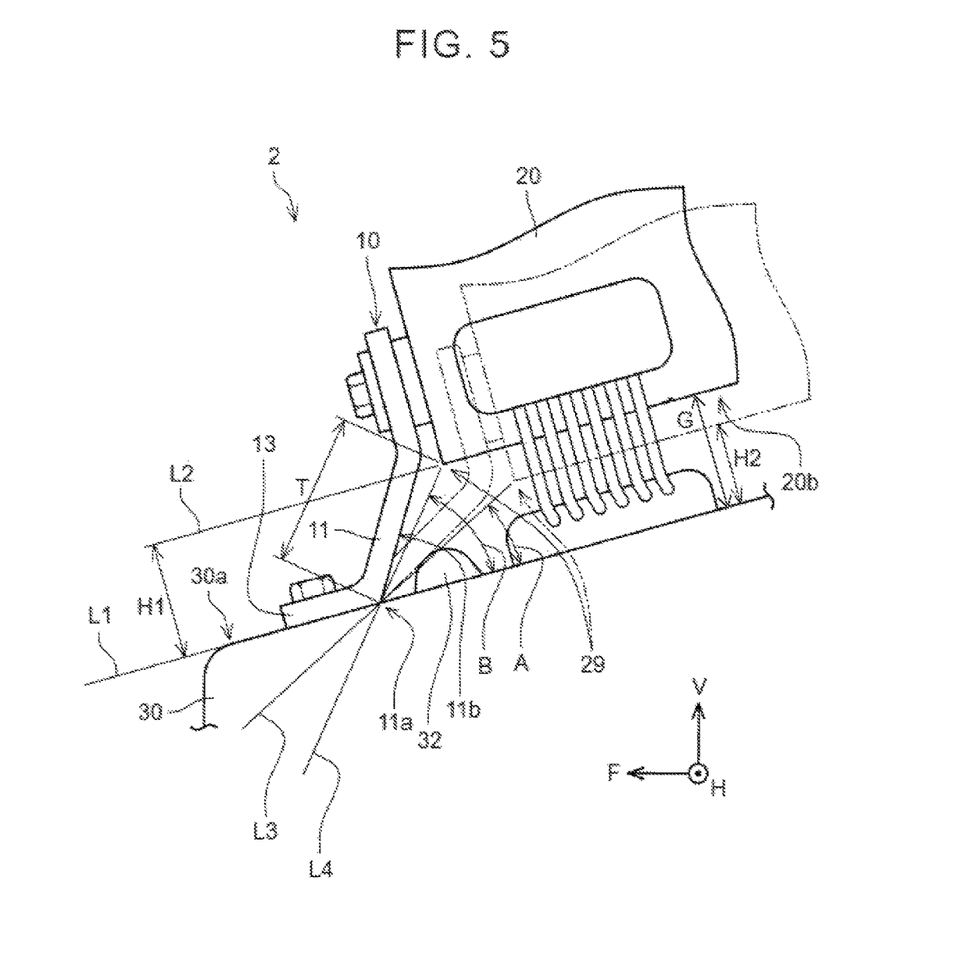
FIG. 5 is an enlarged side view that explains a geometric relationship between the support section and the housing before and after the support section is collapsed.

A description will be made on a geometric relationship between the housing 30 including the projection 32 and the support section 11 with reference to FIG. 5. FIG. 5 is a side view in which the front bracket 10 in the side view of FIG. 3 is enlarged. In FIG. 5, two-dot chain lines schematically represent the support section 11 and the PCU 20 at the time when the support section 11 is collapsed to the rear and comes in contact with the projection 32.

For convenience of the description, some linear lines and some parameters will be defined. The linear lines and the parameters are defined in the side view of the front bracket 10 (FIG. 5). The linear lines and the parameters are denoted by symbols. A linear line that is parallel to the lower surface 20*b* of the PCU 20 before the collapse of the support section 11 and that passes through the coupling point 11*a* of the support section 11 with the base section 13 is described as a reference line L1. In a case of FIG. 5, the upper surface 30*a* of the housing 30 (only that the upper surface excluding the terminal 31) is parallel to the lower surface 20*b* of the PCU 20. Accordingly, the reference line L1 overlaps with the upper surface 30*a* of the housing 30. Noted that a linear line L2 in FIG. 5 is a linear line that passes through a front end of the lower surface (a lower surface front end 29) of the PCU 20 and is parallel to the lower surface 20*b*. A linear line L3 passes through the coupling point 11*a* of the support section 11 and the lower surface front end 29 at the time when the support section 11 is collapsed and comes in contact with the housing 30 (the projection 32). An angle defined by the linear line L3 with respect to the reference line L1 is described as an angle A. A linear line L4 passes through the coupling point 11*a* and the lower surface front end 29 before the support section 11 is collapsed. An angle defined by the linear line L4 with respect to the reference line L1 is described as an angle B. Furthermore, the gap of the space SP between the lower surface 20*b* of the PCU 20 and the housing 30 before the collapse of the support section 11 is denoted by the symbol G (the space gap G). Moreover, the length from the coupling point 11*a* of the support section 11 to the lower surface front end 29 before the collapse is denoted by a symbol T.

When the above symbols are used, a condition that the support section 11 comes in contact with the projection 32 of the housing 30 before the contact of the lower surface 20*b* of the PCU 20 with the housing 30 can be defined by following (formula 1).

$$G > T \cdot \{\sin(B) - \sin(A)\} \quad \text{(formula 1)}$$

The meaning of (formula 1) will be described. Height H1 from the reference line L1 to the lower surface front end 29 before the collapse of the support section 11 is expressed by following (formula 2) by using the above symbols from FIG. 5.

$$H1 = T \cdot \sin(B) \quad \text{(formula 2)}$$

Meanwhile, height H2 from the reference line L1 to the lower surface front end 29 at the time when the support section 11 is collapsed and comes in contact with the projection 32 is expressed by following (formula 3).

$$H2 = T \cdot \sin(A) \quad \text{(formula 3)}$$

It is understood from FIG. 5 that, in the case where the space gap G is longer than a difference between the height H1 and H2, the support section 11 comes in contact with the projection 32 of the housing 30 before the contact of the lower surface 20*b* of the PCU 20 with the housing 30. Accordingly, the geometric relationship is expressed by (formula 1).

For (formula 1), it is assumed that the lower surface 20*b* of the PCU 20 remains parallel at the time when the support section 11 is collapsed. Because the front and rear portions of the PCU 20 are supported by the brackets, it is not only that the front bracket 10 is collapsed to the rear but also that the rear bracket 40 is collapsed to the rear during the frontal collision (including the small overlap collision). Thus, during the collision, the PCU 20 moves while generally keeping a parallel state of the lower surface 20*b*. In addition, the right side of (formula 1) means a distance for which the lower surface front end 29 of the PCU 20 moves toward the reference line L1 (the housing 30). By the way, the housing 30 is inclined to the front, and the PCU 20 is supported while also being inclined to the front. Thus, during the frontal collision, the front end of the PCU 20 is more likely to approach the housing 30 than a rear end thereof. That is, during the collision, the moving distance of the lower surface front end 29 tends to be longer than a moving distance of another portion of the lower surface 20*b*. From the consideration described so far, it is found out a possibility that the other portion of the lower surface 20*b* comes in contact with the housing 30 becomes extremely small in the case where the relationship of (formula 1) is established. That is, it can be said that the condition of (formula 1) can be applied even in the case where the reference line L1 is not parallel to the upper surface 30*a* of the housing 30. In addition, the condition of (formula 1) can be applied even in the case where the height H1 of the lower surface front end 29 from the reference line L1 differs from height of the other portion of the lower surface 20*b* from the reference line L1.

Figure 6:
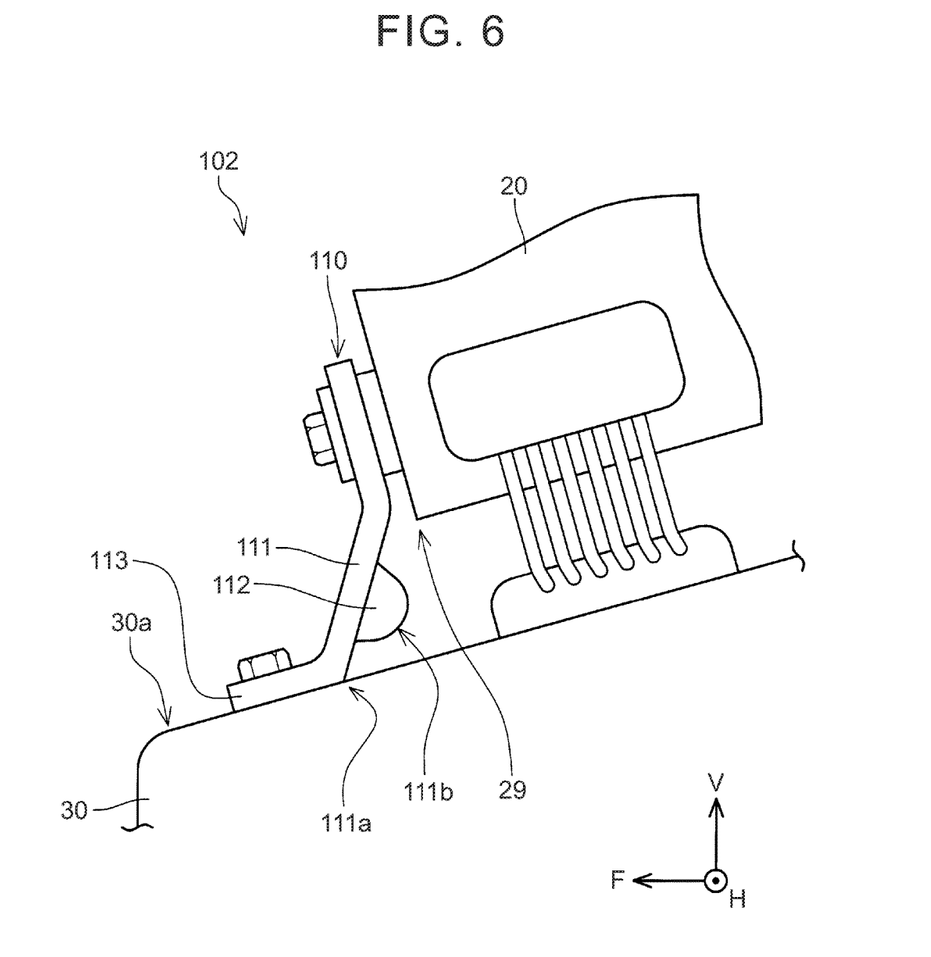
FIG. 6 is a side view that explains a modified example of an on-vehicle structure.

In the above embodiment, the upper surface 30*a* of the housing 30 is provided with the projection 32 that alleviates the shock at the time when the PCU 20 comes in contact with the housing 30. Instead of providing the projection 32 on the housing 30, a projection may be provided on a back surface of the support section 11. FIG. 6 is a side view of an on-vehicle structure 102 in a modified example. Noted that FIG. 6 is the same as FIG. 5 except for the position of the projection. In the on-vehicle structure 102 in FIG. 6, a front bracket 110 has: a base section 113 that is fixed to the housing 30; and a support section 111 that extends from the base section 113 to the PCU 20. A projection 112 is provided on a back surface (a surface facing the rear) of the support section 111. A tip of the projection 112 corresponds to a contact point 111*b* at which the support section 111 comes in contact with the housing 30 when being collapsed to the rear. Size of the projection 112 is defined such that an inclination of the support section 111 equals an inclination of the support section 11 shown in FIG. 4 at a time when the support section 111 is collapsed to the rear and the contact point 111b comes in contact with the housing 30. That is, also in the on-vehicle structure 102, when the support section 111 is collapsed to the rear with a coupling point 111a coupled to the base section 113 being a fulcrum, the projection 112 of the support section 111 comes in contact with the housing 30 before the lower surface 20b of the PCU 20 comes in contact with the housing 30. In other words, a positional relationship between the coupling point 111a and the lower surface front end 29 in the structure of FIG. 6 is the same as a positional relationship indicated by a solid line in FIG. 5. Similarly, a positional relationship between the coupling point 111a and the lower surface front end 29 in the structure of FIG. 6 during collapse of the support section 111 is the same as a positional relationship illustrated by a phantom line in FIG. 5. Accordingly, also with the structure shown in FIG. 6, the shock received by the PCU 20 through the contact with the housing 30 during the frontal (oblique) collision of the vehicle is alleviated. In addition, it is easily understood that parameters (the angle A, the angle B, the length T, the space gap G) that are redefined for the front bracket 110 in FIG. 6 satisfy the relationship of (formula 1).

Figure 7:
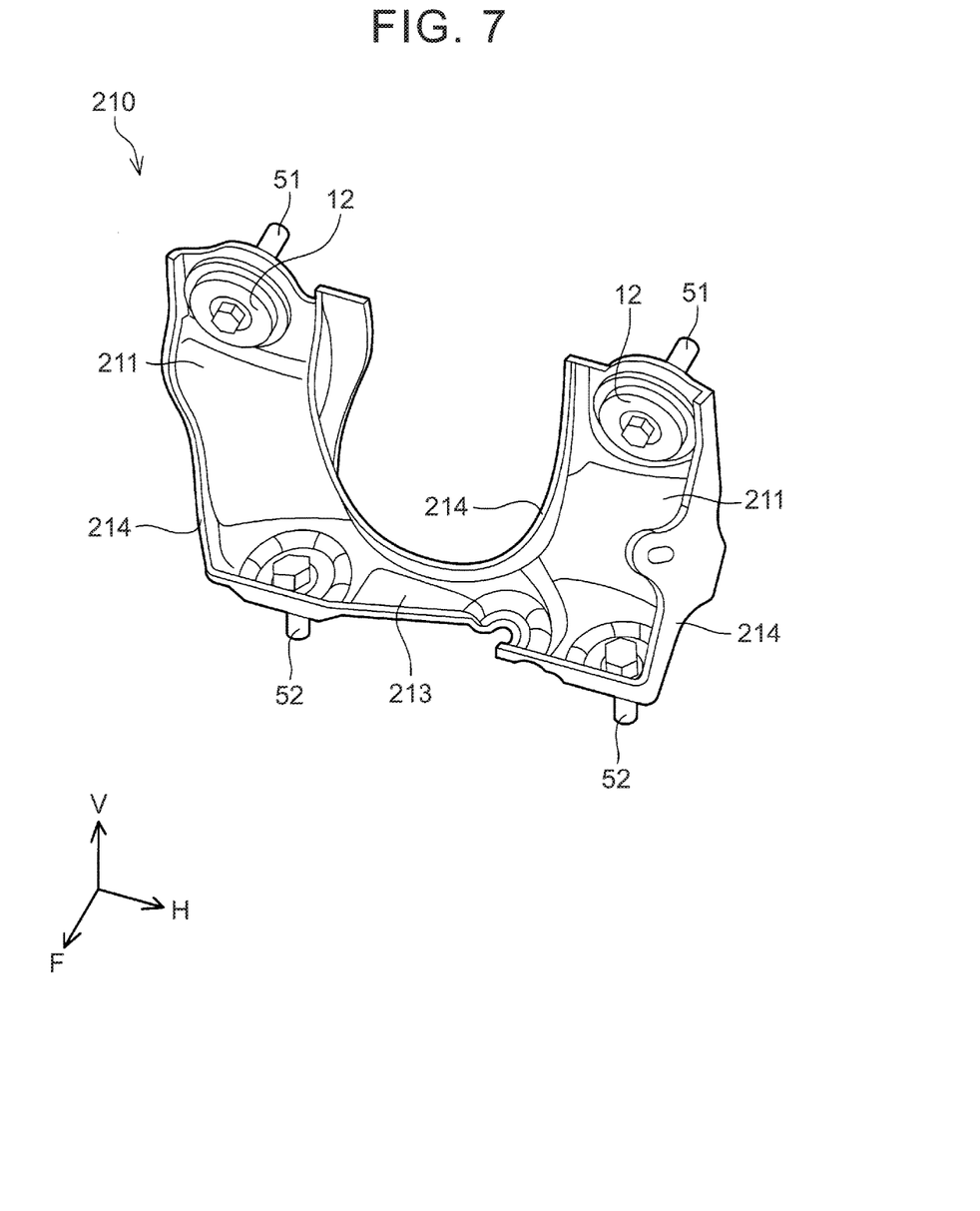
FIG. 7 is a perspective view of a front bracket used in an on-vehicle structure in a second embodiment.
Figure 8:
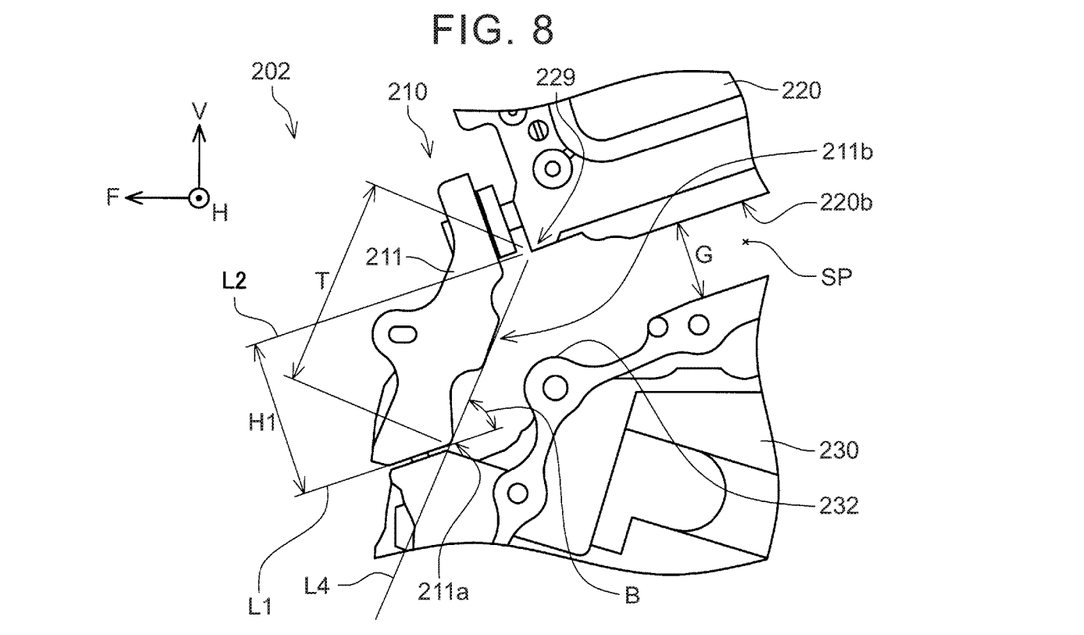
FIG. 8 is a side view that explains arrangement before the support section is collapsed in the on-vehicle structure in the second embodiment.
Figure 9:
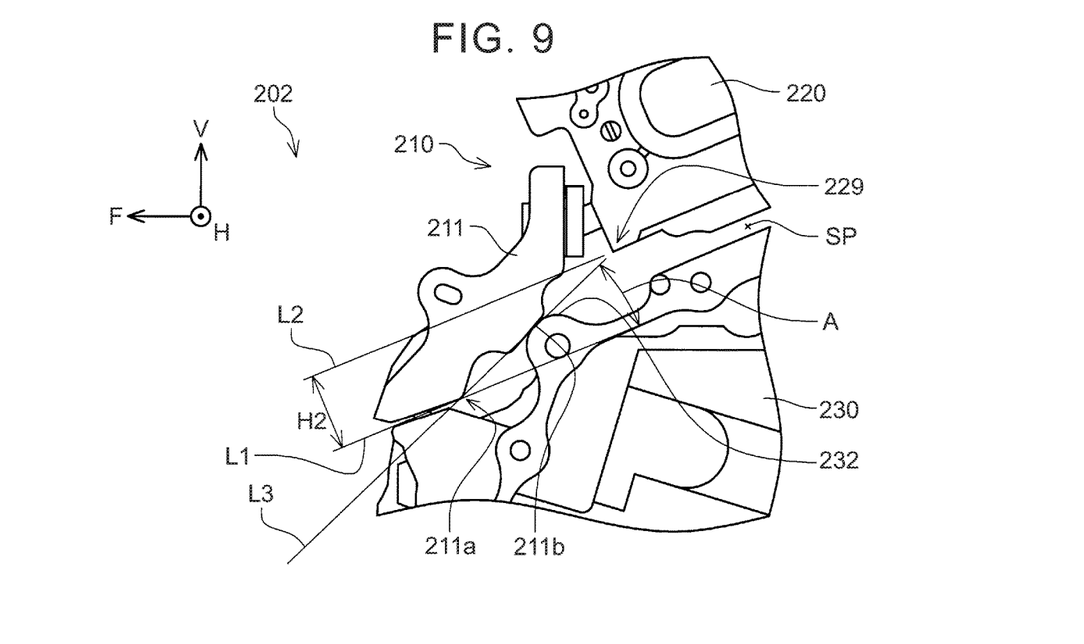
FIG. 9 is a side view that explains arrangement after the support section is collapsed in the on-vehicle structure in the second embodiment.

A description will be made on an on-vehicle structure in a second embodiment by using FIG. 7 to FIG. 9. FIG. 7 is a perspective view of a front bracket 210 used in an on-vehicle structure 202 in the second embodiment. FIG. 8 is an enlarged side view that shows arrangement of a support section 211, a power control unit 220 (PCU 220), and a housing 230 before the support section 211 (will be described below) of the front bracket 210 is collapsed. FIG. 9 is an enlarged side view that shows arrangement of the support section 211, the PCU 220, and the housing 230 after the support section 211 is collapsed. Noted that, similar to FIG. 5, only portions of the PCU 220 and the housing 230 are shown in FIG. 8 and FIG. 9, and the rest thereof are not shown.

The front bracket 210 includes: a base section 213 that is fixed to the housing 230 (see FIG. 8); and two support sections 211 that rise from the base section 213. The base section 213 is fixed to the housing 230 (see FIG. 8) by the two bolts 52. The two support sections 211 extend from the base section 213 to the PCU 220. The vibration-proof bush 12 is attached to a tip of each of the two support sections 211, and the support sections 211 are fixed to a front surface of the PCU 220 via the vibration-proof bushes 12 (see FIG. 8). The tips of the support sections 211 are fixed to the PCU 220 by the bolts 51. Ribs 214 that increase strength are provided at edges of the base section 213 and the support sections 211.

Similar to the case of the first embodiment, some linear lines and parameters will be defined, and some of the parameters will be denoted by symbols. The linear lines and the parameters are defined in the side view of the front bracket 210 (FIG. 8, FIG. 9). A linear line that is parallel to a lower surface 220b of the PCU 220 before the collapse of the support section 211 and that passes through a coupling point 211a coupled to the base section 213 of the support section 211 is described as a reference line L1. A linear line L2 is a linear line that passes through a front end of the lower surface 220b (a lower surface front end 229) of the PCU 220 and is parallel to the reference line L1.

The housing 230 is provided with a projection 232 at a position that corresponds to the rear of each of the support sections 211. When the support sections 211 are collapsed, contact points 211b that are provided on back surfaces of the support sections 211 come in contact with the projections 232. An angle defined by a linear line L3 that passes through the lower surface front end 229 and the coupling point 211a with respect to the reference line L1 is described as an angle A (FIG. 9). A linear line L4 passes through the lower surface front end 229 and the coupling point 211a before the support sections 211 are collapsed. An angle defined by the linear line L4 with respect to the reference line L1 is described as an angle B (FIG. 8). Furthermore, a gap of the space SP between the lower surface 220b of the PCU 220 and the housing 230 before the collapse of the support sections 211 is described as a space gap G. Moreover, the length from each of the coupling points 211a of the support sections 211 to the lower surface front end 229 is denoted by a symbol T.

When the PCU 220 receives a load from the front during the frontal collision, the support sections 211 of the front bracket 210 are collapsed to the rear with the coupling points 211a to the base section 213 being fulcrums. Height H11 (FIG. 8) from the reference line L1 to the lower surface front end 229 of the PCU 220 before the collapse of the support sections 211 can be expressed by the above (formula 2). Similarly, height H2 (FIG. 9) from the reference line L1 to the lower surface front end 229 at the time when the support sections 211 are collapsed and the contact points 2111b come in contact with the projections 232 can be expressed by the above (formula 3). In a period from the collapse of the support sections 211 to contact with the projections 232, a distance for which the lower surface front end 229 moves toward the housing 230 is "H1−H2". As described above, there is a high possibility that the moving distance of the lower surface front end 229 is equal to or longer than a moving distance of another portion of the lower surface 220b. Accordingly, in the case where the space gap G is longer than "H1−H2", the support sections 211 come in contact with the housing 230 before the contact of the PCU 220 with the housing 230. That is, in the case where (formula 1) is established, the support sections 211 come in contact with the housing 230 before the contact of the PCU 220 with the housing 230 during the frontal collision.

Points of attention in the technique described in the embodiments will be described. As it has been described in the embodiments, in order to make the front bracket come in contact with the housing before the contact of the PCU with the housing during the frontal collision, the projection needs to be provided on only one of the support section of the front bracket and the housing. The technique disclosed in this specification can be realized by slightly changing the existing on-vehicle structure.

In the on-vehicle structures of the embodiments, the front bracket is attached to the front surface of the PCU. However, the front bracket may be attached to a bottom surface or a front section of a side surface of the PCU. In the embodiments, the on-vehicle structures, each of which is applied to the hybrid vehicle 100, are described. The technique disclosed in this specification can also be applied to an electric vehicle and a fuel cell vehicle. In a case of the fuel cell vehicle, the power control unit is a device that drives the motor by converting output power of a fuel cell and supplying converted power to the motor.

In the example in FIG. 3 to FIG. 5, the projection is provided on the upper surface of the housing. In the example in FIG. 6, the projection is provided on the back surface of the support section of the front bracket. The projection may be provided on both of the upper surface of the housing and the back surface of the support section. In such a case, the projection on the upper surface of the housing may be provided at a position at which the projection of the housing opposes the projection of the support section. A structure in which the projection on the back surface of the support section abuts against the projection on the upper surface of the housing at the time when the support section is collapsed to the rear is adopted. In such a case, an angle at which the support section can be collapsed (that is, "the angle B−the angle A" in the above-described embodiment) can be reduced. When the angle at which the support section can be collapsed is small, the distance for which the power control unit (PCU) can approach the upper surface of the housing can be reduced.

This embodiment will be summarized as follows. The power control unit is fixed with the space being provided above the housing for housing the motor while the front and rear portions thereof are respectively supported by the front bracket and the rear bracket. The front bracket includes: a base section that is fixed to the housing; and a support section that extends from the base section to the power control unit. When the support section is collapsed to the rear due to the load applied to the power control unit from the front, the support section comes in contact with the housing before the contact of the lower surface of the power control unit with the housing.

One aspect of an on-vehicle structure disclosed in this specification is as follows. A power control unit is mounted in a front space of a vehicle. A front portion and a rear portion of the power control unit are respectively supported by a front bracket and a rear bracket, and the power control unit is fixed with the space being provided above a housing of a motor. The front bracket includes: a base section that is fixed to the housing; and a support section that extends from the base section to the power control unit. For convenience of the description, a surface of the support section that faces the rear of the vehicle will hereinafter be described as a back surface. A geometric relationship between the support section of the front bracket and the housing is defined to satisfy the following relationship. That is, when the support section is collapsed to the rear due to a load applied to the power control unit from the front, the support section comes in contact with the housing before a lower surface of the power control unit comes in contact with an upper surface of the housing. The following effects can be expected by the above geometric relationship. Momentum of the power control unit for approaching the housing is weakened by contact between the support section and the housing. Thus, contact between the power control unit and the housing is avoided. Alternatively, there can be such a case where the support section is further deformed after the contact with the housing and the power control unit comes in contact with the housing. Even in such a case, the momentum of the power control unit for approaching the housing is weakened by the contact between the support section and the housing. Thus, a shock received by the power control unit through the contact with the housing is alleviated.

One example of the geometrical relationship that makes the support section of the front bracket come in contact with the housing prior to the power control unit is shown by the following (formula 1). $G > T \cdot \{\sin(B) - \sin(A)\}$ (formula 1). Here, symbols G, T, A, and B are defined as follows in a side view of the power control unit and the housing. First, a linear line that is parallel to a lower surface of the power control unit before collapse of the support section and that passes through a coupling point between the base section and the support section of the front bracket is set as a reference line. The symbol A represents an angle (angle A) that is defined by a linear line with respect to the reference line, the linear line passing through the coupling point and a lower surface front end of the housing when the support section is collapsed and comes in contact with the housing. The symbol B represents an angle (angle B) that is defined by a linear line with respect to the reference line, the linear line passing through the coupling point and the lower surface front end before collapse of the support section. The symbol G represents a gap of the space (a space gap G) between the lower surface of the power control unit and the housing before the collapse of the support section. The symbol T represents a length (length T) from the coupling point of the support section to the lower surface front end.

The relationship of (formula 1) described above can be realized relatively easily. For example, a projection needs to be provided on only one of the support section and the housing. For example, the projection is provided on the housing in such a manner so as to oppose the back surface of the support section. By providing the projection, the angle A described above is increased, and a right side of (formula 1) is reduced. Because it only needs to provide one projection on the housing or the support section, the technique disclosed in this specification can easily be applied to various types of vehicles, in which the power control unit is supported by the bracket above the housing. The details of the technique disclosed in this specification and improvements thereof will be described in the section of the detailed description of embodiments below.

Technical elements that are described in this specification and the drawings demonstrate technical utility when used singly or in various combinations. In addition, the techniques that are illustrated in this specification and the drawings can achieve a plurality of purposes simultaneously and demonstrate the technical utility by achieving one purpose thereof itself.

What is claimed is:
1. An on-vehicle structure comprising:
a motor unit including a housing and a motor for traveling housed in the housing; and
a power control unit configured to drive the motor, the power control unit mounted in a front space of a vehicle, the power control unit fixed by a front bracket and a rear bracket above the housing, a space being defined between a lower surface of the power control unit and the housing, the rear bracket configured to support a rear side of the power control unit on the housing, the front bracket configured to support a front side of the power control unit on the housing, the front bracket including:
a base section fixed to the housing; and
a support section extending from the base section to the power control unit, the support section configured to contact with the housing before the lower surface of the power control unit contacts with an upper surface of the housing when the support section is collapsed rearward by a load applied to the power control unit from front, wherein
T is a length from a coupling point between the support section and the base section to a front end of the lower surface of the power control unit, T satisfies a relationship $G > T \cdot \{\sin(B) - \sin(A)\}$ in a side view of the power control unit and the housing,
where A is an angle defined by a first linear line with respect to a reference line, the first linear line passes through the coupling point and the front end of the power control unit when the support section is collapsed and contacts with the housing, and the reference line is parallel to the lower surface of the power control unit before collapse of the support section and passes through the coupling point, B is an angle defined by a second linear line with respect to the reference line, the second linear line passes through the coupling point and the front end of the power control unit before the support section is collapsed, and G is a gap of the space between the lower surface of the power control unit and a power cable terminal before the collapse of the support section.

2. The on-vehicle structure according to claim 1, wherein at least one of the support section and the housing includes a projection, and the projection contacts with another one of the support section and the housing when the support section is collapsed rearward.

* * * * *